(12) United States Patent
Kutscher et al.

(10) Patent No.: US 9,707,914 B2
(45) Date of Patent: Jul. 18, 2017

(54) ATTACHMENT MEANS FOR MOUNTING A BUMPER CROSS-BEAM ONTO A VEHICLE STRUCTURE

(71) Applicant: CONSTELLIUM SINGEN GMBH, Singen (DE)

(72) Inventors: Matthias Kutscher, Constance (DE); Thomas Spaelte, Tengen (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 71 days.

(21) Appl. No.: 14/781,084

(22) PCT Filed: Apr. 2, 2014

(86) PCT No.: PCT/EP2014/000875
§ 371 (c)(1),
(2) Date: Sep. 29, 2015

(87) PCT Pub. No.: WO2014/161659
PCT Pub. Date: Sep. 10, 2014

(65) Prior Publication Data
US 2016/0304044 A1   Oct. 20, 2016

(30) Foreign Application Priority Data

Apr. 5, 2013  (EP) ..................... 13354013

(51) Int. Cl.
*B60R 19/34* (2006.01)
*B21D 28/00* (2006.01)
(Continued)

(52) U.S. Cl.
CPC ............. *B60R 19/34* (2013.01); *B21D 28/00* (2013.01); *B21D 53/88* (2013.01); *B60R 19/023* (2013.01);
(Continued)

(58) Field of Classification Search
CPC ....... B60R 19/34; B60R 19/023; B60R 19/24; B60R 2019/242; B21D 28/00; B21D 53/88
See application file for complete search history.

(56) References Cited

U.S. PATENT DOCUMENTS 5,584,518 A * 12/1996 Frank ...................... B60R 19/24
                                              293/102
5,727,827 A * 3/1998 Shibuya .................. B60R 19/24
                                              293/155
(Continued)

FOREIGN PATENT DOCUMENTS

DE    102008022564 A1   11/2009
WO    2009072450 A1      6/2009

OTHER PUBLICATIONS

International Search Report mailed on May 13, 2014, corresponding to International Application No. PCT/EP2014/000875.

*Primary Examiner* — Lori L Lyjak
(74) *Attorney, Agent, or Firm* — Ladas & Parry LLP

(57) ABSTRACT

A device for mounting a bumper cross-beam onto a vehicle structure, the attachment means having a first end to be fixed to the vehicle structure and a second end designed to be attached to the bumper cross-beam, the attachment means being made from a hollow section profile, the periphery of which includes opposite side walls and substantially parallel opposite outer walls, wherein the hollow section profile includes opposite peripheral chambers, each peripheral chamber being at least delimited by one of opposite outer wall and an inner wall, which is substantially parallel to the outer wall and extends between the opposite side walls, wherein the inner walls are spaced apart from each other by a distance Hi, and the second end includes opposite double-walled flanges, which are spaced apart from each other by a distance H strictly greater than Hi.

17 Claims, 3 Drawing Sheets

(51) Int. Cl.
*B21D 53/88* (2006.01)
*B60R 19/02* (2006.01)
*B60R 19/24* (2006.01)

(52) U.S. Cl.
CPC ........ *B60R 19/24* (2013.01); *B60R 2019/242* (2013.01)

(56) References Cited

U.S. PATENT DOCUMENTS

| | | | |
|---|---|---|---|
| 6,918,621 B2* | 7/2005 | Seksaria | B60R 19/34 293/102 |
| 7,401,825 B2 | 7/2008 | Frank et al. | |

* cited by examiner

ATTACHMENT MEANS FOR MOUNTING A BUMPER CROSS-BEAM ONTO A VEHICLE STRUCTURE

This application is a 371 of PCT/EP2014/000875, filed on Apr. 2, 2014, which claims priority to European Application No. 13354013.8, filed Apr. 5, 2013.

The invention relates to attachment means for mounting a bumper cross-beam onto a vehicle structure. The invention relates more particularly to the design and the forming process of the end of the said attachment means, which is to be fixed to the bumper cross-beam. Such attachment means are advantageously deformation elements, also called "Crash-Box" or "C-Box", which are designed to absorb by plastic deformation as most as possible kinetic energy in case of crash of the vehicle.

A bumper cross-beam comprises generally vertical front and rear walls, which play respectively the role of compressive strut and tensile strut in case of collision and which are spaced apart thanks to transverse or flanking walls. These flanking walls are usually horizontal upper and lower walls. Bumper cross-beams are often profiles advantageously extruded from an aluminium alloy, comprising a hollow section member with at least a chamber delimited by the said vertical front and rear walls and horizontal upper and lower flanking walls. Since vehicles are delivered in different countries and in different variants, the hollow section member should be positioned at various heights relative to the vehicle structure, in particular the longitudinal beams. In order to comply with test procedures defined by the Research Council for Automotive Repairs (RCAR) which asses the bumper performance, the hollow section member of the bumper cross-beam should be positioned to fully engage with the barrier of the RCAR test and should have a significant height, typically higher than 100 mm.

Bumper cross-beams are designed such that the force at which they begin to plastically deform is lower than the force necessary to irreversibly deform the vehicle structure. In the case of a minor collision, only the bumper cross-beam is deformed with the result that this sole part has to be replaced. In the past, deformation elements, also called "crash-boxes", have been proposed to increase the maximum force of impact at which there is still no plastic deformation of the vehicle structure. Located between the cross-beam and the vehicle structure (e.g. its longitudinal beams), they are further used as attachment means. They are designed to be plastically deformed as soon as the kinetic energy of the vehicle at the time of the collision is higher than a critical value. Their plastic deformation is advantageously a progressive folding, which absorbs at least partially the energy of impact. The deformation elements are usually in the form of hollow section profiles, generally multi-chamber hollow section profiles, whereby their longitudinal axis lies in the direction of the longitudinal axis of the vehicle.

U.S. Pat. No. 7,401,825 describes a bumper system with a bumper cross-beam having a hollow section member and two attachment means in the form of extruded multi-chamber hollow section profiles. The periphery of the cross-section of the multi-chamber hollow section profile includes opposite vertical side walls, and opposite horizontal outer walls. The hollow section profile comprises opposite peripheral chambers separated by a middle chamber, wherein each peripheral chamber is at least delimited by one of the said outer walls and a horizontal inner wall which is parallel to the said outer wall and extends between the said opposite side walls. The end of the attachment means intended to be attached with the bumper cross-beam comprises opposite horizontal upper and lower double-walled flanges, which overlap the horizontal flanking walls of the bumper cross beam and are releasably attached thereto. These double-walled flanges were obtained by collapsing the peripheral chambers and by removing, near the edge of the said end, portions of the parts of the opposite side walls, which delimitate the middle chamber, such that the hollow section member of the bumper cross-beam engages at least partially in the space between these opposite double-walled flanges.

German patent application DE 10 2008 022 564 describes also a bumper system with a bumper cross-beam having a hollow section member and two attachment means in the form of multi-chamber hollow section profiles. The hollow section profiles include also vertical opposite side walls, horizontal opposite upper and lower outer walls, and opposite upper an lower chambers separated by a middle chamber. The ends of the attachment means to be fixed to the bumper cross-beam have an asymmetric shape, such that the bumper cross-beam may have at least two possible holding positions relative to the longitudinal beams once attached to the vehicle structure (longitudinal beams). Each of these ends comprises opposite flanges, which overlap the horizontal flanking walls of the bumper cross beam and are releasably attached thereto. These opposite flanges are not manufactured in the same way: one of them is a double wall resulting from collapsing the corresponding peripheral (lower or upper) chamber, the other one is the remaining part of the outer wall of the other peripheral (upper or lower) peripheral chamber after the other walls of the latter have been removed, typically by machining, die cutting or machining.

In the case of U.S. Pat. No. 7,401,825, the symmetrical mechanical behaviour of the end of the double-walled flanges allows a stable and stiff connection with the bumper cross-beam and a reliable energy absorbing capacity in case of impact. However, these attachment means, which are excellent deformation elements, have ends, which may be fit only with a bumper cross-beam, the hollow section member of which has a small height, i.e. a low distance between the flanking walls, because the said distance is limited to the height of the middle chamber. Since the hollow section member of the bumper cross-beam should have a significant height to comply with RCAR test procedures which asses the bumper performance, the crash-box should have a middle chamber as high as possible, which may result in providing crash-boxes having an inappropriate shape and, as a result, an unnecessary weight.

In the case of DE 10 2008 022 564, the dissymmetrical geometry of the crash-box end allows a fit with bumpers having a higher hollow section member. However, the dissymmetrical mechanical behaviour of the flanges of the crash-box renders the connection between the is attachment means and the bumper less stable, in particular under crash load cases, which involve a torque and/or a bending momentum. As a result, the attachment means may have a less reliable buckling-free plastic folding during a crash and consequently absorb less energy than wished.

Therefore there still exists a need for providing attachment means, which allow a stable and stiff connection with the bumper cross-beam, may be fit with bumper cross-beams having a high hollow section member, serve as reliable deformation elements and with which the bumper cross-member may be positioned in a simple manner in different heights relative to the vehicle structure.

A first object of the invention is an attachment means for mounting a bumper cross-beam onto a vehicle structure, the said attachment means having a first end to be fixed to the said vehicle structure and a second end designed to be attached to the said bumper cross-beam, the said second end comprising opposite double-walled flanges called respectively upper double-walled flange and lower double-walled flange which are spaced apart from each other by a distance H, the said attachment means being made from a hollow section profile, the periphery of which comprises opposite side walls and opposite outer walls, called respectively upper outer wall and lower outer wall, wherein the said opposite outer walls are substantially parallel, wherein the said hollow section profile comprises opposite peripheral chambers, called respectively lower chamber and upper chamber, the said lower chamber being at least delimited by the lower outer wall and a lower inner wall, which is substantially parallel to the said lower outer wall and extends between the said opposite side walls, the said upper chamber being delimited by at least the upper outer wall and an upper inner wall which is substantially parallel to the said upper outer wall and extends between the said opposite side walls, wherein the said upper inner wall and the said lower inner wall are spaced apart by a distance Hi, characterised in that the distance H is strictly greater than the distance Hi.

The attachment means is designed for mounting the said bumper cross-beam onto a vehicle structure, typically, on its longitudinal beams. It is made from a hollow section profile having a first end to be fixed to the said vehicle structure and a second end comprising opposite double-walled flanges designed to overlap opposite walls of the bumper cross-beam and to be releasably attached thereto. Advantageously, the said hollow section profile is a multi-chamber hollow section profile extruded from an aluminium alloy, typically an alloy belonging to the 6xxx Aluminium Association series. Advantageously, the said attachments means are deformation elements designed to absorb at least partially the energy of impact by buckling-free progressive plastic folding thereof.

To facilitate the description of the attachment means, the opposite double-walled flanges are respectively called here "lower double-walled flange" and "upper double-walled flange" because they overlap in a preferred embodiment the horizontal flanking walls of the bumper cross-beam thanks to which the vertical rear wall and front wall are spaced apart. Obviously, the attachment means according to the invention may be positioned differently. For example, they could have opposite vertical double-walled flanges to be attached to vertical longitudinal ribs provided on the bumper cross-beam. The periphery of the cross-section of the hollow section profile comprises opposite side walls and substantially parallel opposite outer walls, which are called "upper outer wall" and "lower outer wall" for the reason above. The hollow section profile comprises opposite peripheral chambers, which are respectively called "lower chamber" and "upper chamber" for the same reason. Each peripheral chamber is at least delimited by one of said opposite outer walls and an inner wall, which is substantially parallel to the said outer wall and extends between the opposite side walls. In preferred embodiments, the multi-chamber hollow section profiles comprise an upper chamber and a lower chamber separated by a middle chamber. In these embodiments, the walls other than the said opposite outer wall and inner wall, which complete the delimitation of the said peripheral chamber are parts of the said opposite side walls. Since the multi-chamber hollow section profile may comprise more than three chambers, e.g. additional lateral chambers, the walls other than the said opposite outer wall and inner wall, which complete the delimitation of the said peripheral chamber may be walls, which separate the said peripheral chamber from the said lateral chambers.

Referring to the hollow section profile, the cross-section of which is illustrated on FIG. 2b, the lower chamber (30) is at least delimited by the lower outer wall (27) and a lower inner wall (32), which is substantially parallel to the lower outer wall and extends between the opposite side walls (24 and 25). The other walls, which complete the delimitation of the lower chamber (30) are parts (242 and 252) of the opposite side walls (24 and 25). The upper chamber (29) is at least delimited by the upper outer wall (26) and an upper inner wall (31), which is substantially parallel to the said upper outer wall and extends between the opposite side walls (24 and 25). The other walls, which complete the delimitation of the upper chamber (29) are parts (241 and 251) of the opposite side walls (24 and 25)

Similarly to the attachment means of U.S. Pat. No. 7,401,825, the said second end comprises opposite double-walled flanges designed to overlap opposite walls of the bumper cross-beam and to be releasably attached thereto. However, contrarily to U.S. Pat. No. 7,401,825, the opposite double-walled flanges do not form U-shaped channels and the distance between them is higher than the distance Hi between the lower inner wall and the upper inner wall.

In a preferred embodiment, the second end of the said attachment means is manufactured from the said hollow section profile without adding any additional part to obtain the said double-walled flanges. Each double-walled flange results from bringing closer together the outer wall and the inner wall of a peripheral chamber until they are in contact, such that the peripheral chamber collapses. Thus, each double-walled flange results from collapsing a peripheral chamber, either by pushing and pressing the outer wall of the said peripheral chamber against the corresponding inner wall and/or by pushing and pressing the inner wall of the said peripheral chamber against the corresponding outer wall.

In some embodiments, in particular when the targeted distance H between the opposite double-walled flanges is lower than He-$t_l$-$t_u$, where He is the distance between the opposite outer walls, $t_l$ is the thickness of the lower inner wall and $t_u$ is the thickness of the upper inner wall, at least one of the said double-walled flanges results from pushing and pressing the outer wall of the peripheral chamber to be collapsed towards the corresponding inner wall, e.g. by using a pushing tool which is applied against the said outer wall and moves from the outside towards the inside of the hollow section profile. As a result, the double-walled flange thus obtained is inwardly offset with respect to the outer wall of the undeformed part of the hollow section profile.

However, in any case, since H is strictly greater than Hi in the frame of the present invention, it follows that at least one of the said opposite double-walled flanges results from pushing the inner wall towards the outer wall of the peripheral chamber to be collapsed. The inner wall is pushed against the corresponding outer wall by using a tool which is applied to the inner wall and moves from the inside towards the outside of the hollow section profile. In preferred embodiments, the said pushing tool stops when the inner wall comes into contact with the outer wall, which has not been pushed or deformed previously, and the double-walled flange thus obtained is in the substantially straight continuation of the outer wall of the hollow section profile. In some other embodiments, the outer wall has been previously pushed towards the centre of the hollow section profile and the double-walled flange thus obtained is inwardly offset with respect to the outer wall of the hollow section profile.

In some other embodiments, the outer wall has been previously pushed toward the exterior of the hollow section profile and the double-walled flange thus obtained is outwardly offset with respect to outer wall of the hollow section profile. In still other embodiments, the outer wall has not been previously pushed, the said pushing tool does not stop when the inner wall comes into contact with the outer wall and drives both inner and outer walls together until the wished distance is obtained. The double-walled flange thus obtained is also outwardly offset with respect to the corresponding outer wall of the hollow section profile.

In other words, at least one of the double-walled flanges results from collapsing a peripheral chamber by using an internal pushing tool moving from the inside towards the outside of the hollow section profile. If necessary, an external pushing tool is used moving from the outside to the inside of the hollow section profile. Thus, by controlling on each peripheral chamber to be collapsed the centrifugal movement of the internal pushing tool and, if any, the centripetal movement of the external pushing tool, we may obtain a set of opposite double-walled flanges which are spaced apart by a distance which may be significantly higher than the height of the middle chamber, even higher than the height of the hollow section profile, and which may be offset with respect to the outer walls of the undeformed hollow section profile, such that attachment means may be made from the same hollow section profile, which allow a large number of different bumper cross-beams to be positioned in different heights relative to the vehicle structure. Preferably, in particular when the attachment means play also the role of crash-boxes, each peripheral chamber is collapsed on the same manner in order to keep a symmetrical mechanical behaviour of the double-walled flanges, which allows a stable and stiff connection with the bumper cross-beam.

Preferably, in particular when the said attachment means is made from a hollow section profile extruded from an aluminium alloy, the targeted distance H between the upper double-walled flange and the lower double-walled flange is lower than $1.2*He$, more preferably lower than $1.1*He$, even more preferably lower than $1.1*(He-t_l-t_u)$, such that it is not necessary to impose any additional specific heat treatment before the shaping of the second end to improve the ductility of the alloy.

To facilitate the shaping of the said second end, in particular the collapse of a peripheral chamber by pushing an inner wall towards the corresponding outer wall, the parts of the opposite side walls, which do not delimitate the peripheral chamber to be collapsed but are near the said inner wall, have portions which are removed typically by stamping, machining or the like. The resulting notches extend from the edge of the second end along a given length, typically higher than He/2, which is all the more high as the displacement imposed on the inner wall is important. For example, the peripheral chambers are separated by a middle chamber and parts of the opposite side walls have removed portions at the level of the said middle chamber, in the vicinity of the inner wall, which separates the middle chamber from the peripheral chamber to be collapsed, to form notches, typically with slot-shaped extensions, which extend from the edge of the second end along a length typically higher than He/2.

To facilitate the plastic deformation of the inner wall when it is pushed from the interior towards the corresponding outer wall, the said inner wall is advantageously provided with at least one slot near the edge of the second end to facilitate the said inner wall and the corresponding outer wall to be brought closer together. For example, the inner wall comprises two longitudinal slots or a U-shaped slot having longitudinal flanges and a base near the edge of the second end.

Preferably, the hollow section profile comprises an upper chamber and a lower chamber, which are peripheral chambers separated from each other by a middle chamber. The said lower inner wall separates the said lower chamber from the middle chamber. The said upper inner wall separates the said upper chamber from the middle chamber. To facilitate the inner wall to be pushed against the corresponding outer wall to collapse the corresponding peripheral chamber, portions of the parts of the opposite side walls which delimitate the middle chamber are removed to form notches extending from the edge of the said second end along a given length, typically higher than He/2.

The second end of the attachment means according to the invention has a shape and a structure which make it particularly suitable in the case where he also serves as a Crash-box, i.e. a deformation element designed to absorb at least partially the energy of impact by buckling-free progressive plastic folding thereof. Indeed, the symmetrical mechanical behaviour of the double-walled flanges of the crash-box end allows a stable and stiff connection with the bumper cross-beam. Moreover, such a crash-box end may be fit with a bumper cross-beam having a quite high distance between the flanking walls, thanks to which the compressive strut and the tensile strut are spaced apart, because the said distance is no more limited to the height of the middle chamber of the hollow section profile of the attachment means. It may be fit with bumper cross-beams having a hollow section member higher than those of U.S. Pat. No. 7,401,825. By controlling the collapse of the peripheral chambers, we may obtain double-walled flanges which are offset with respect to the outer walls of the hollow section profile part of the attachment means, such that the bumper cross-member may be positioned in a simple manner in different heights relative to the vehicle structure.

Another object of the invention is a bumper system comprising a bumper cross-beam and attachment means for mounting the said bumper cross-beam onto a vehicle structure, characterised in that the said attachment means are attachment means according to the invention, wherein each of the said opposite double-walled flanges overlaps a wall or rib provided in the bumper cross-beam so that each pair of double-walled flange and wall or rib can be traversed by fixing means, typically bolts and nuts. The bumper cross-beam comprises generally a front wall and a rear wall, which are substantially vertical and which play respectively the role of a compressive strut and a tensile strut in case of collision and are spaced apart thanks to substantially horizontal flanking walls, typically an upper flanking wall and a lower flanking wall. In a preferred embodiment, the said upper double-walled flange overlaps the said upper flanking wall and the said lower double-walled flange overlaps the said lower flanking wall so that each pair of double-walled flange and flanking wall can be traversed by fixing means.

Another object of the invention is a manufacturing process of an attachment means for mounting a bumper cross-beam onto a vehicle structure, which comprises following successive steps:

a) providing a hollow section profile, with a cross-section having a periphery comprising opposite side walls and opposite outer walls, wherein the hollow section profile comprises opposite peripheral chambers delimited at least by one of the said opposite outer walls and an inner wall, which is substantially parallel to the said outer wall and extends between the said opposite side walls;

b) cutting the said hollow section profile at a predetermined length to obtain a profile part;
c) at one of the ends of the said profile part, over a length at least equal to the half height of the said profile part, collapsing at least one of the said opposite peripheral chambers, by pushing the inner wall towards the outer wall of the said peripheral chamber to be collapsed.

During step c), the outer wall may also be pushed inwardly or outwardly, before or after the outer wall and the inner wall come into contact.

Advantageously, before step c), portions are removed typically by machining, die cutting, stamping or the like in the parts of the opposite side walls, which are near the peripheral chamber to be collapsed, but which do not delimitate it. For example, the hollow section profile comprises an upper chamber and a lower chamber, which are peripheral chambers separated from each other by a middle chamber. The said lower inner wall separates the said lower chamber from the middle chamber. The said upper inner wall separates the said upper chamber from the middle chamber. To facilitate the inner wall to be pushed against the corresponding outer wall to collapse the corresponding peripheral chamber, portions of the parts of the opposite side walls which delimitate the middle chamber are removed to form notches extending from the edge of the said second end along a given length, typically higher than He/2.

Advantageously, the inner wall which delimitates the chamber to be collapsed before step c) is perforated, typically by stamping, die cutting or machining, to form one or more slot(s) to facilitate the chamber to be collapsed. The part of the inner wall, which is delimited by said slot(s) and is not directly pushed, does not retain the other part of the inner wall, which is pushed towards the outer wall and is therefore more easily plastically deformed. Preferably, a U-shaped slot is machined through the thickness of the inner wall, wherein the flanges of the U are oriented along the longitudinal direction of the profile and the base of the U is near the edge of the profile end. In such a case, the tongue formed by the U-shaped slot is the part of the inner wall, is not directly pushed and remains in the substantially straight continuation of the inner wall of the undeformed part of the hollow section profile.

The double-walled flanges are then provided with holes designed to be aligned with holes machined on the flanking walls of the hollow section member of the bumper cross-beam, such that screws or similar connecting means may engage therein.

BRIEF DESCRIPTION OF THE DRAWINGS

Three different embodiments of the invention are illustrated in the following figures. A first embodiment is illustrated in FIG. 3a, FIG. 4 and FIG. 6. A second embodiment is illustrated in FIG. 3b. A third embodiment, which a variant of the first one positioned upside down, is illustrated in FIG. 5.

Figure 1:
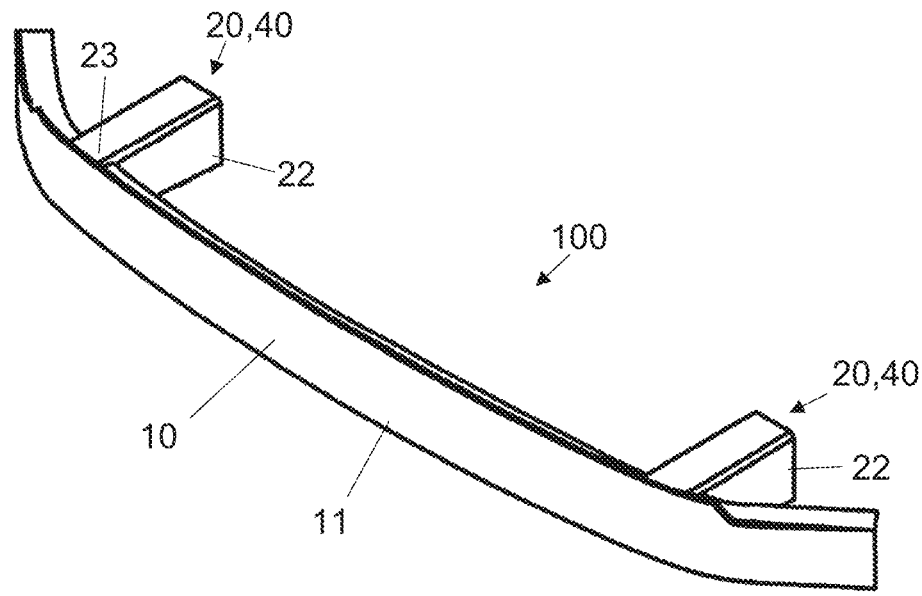
FIG. 1 is a perspective view of a bumper with attachment means for mounting onto longitudinal beams of a vehicle structure.
Figures 2A, 2B:
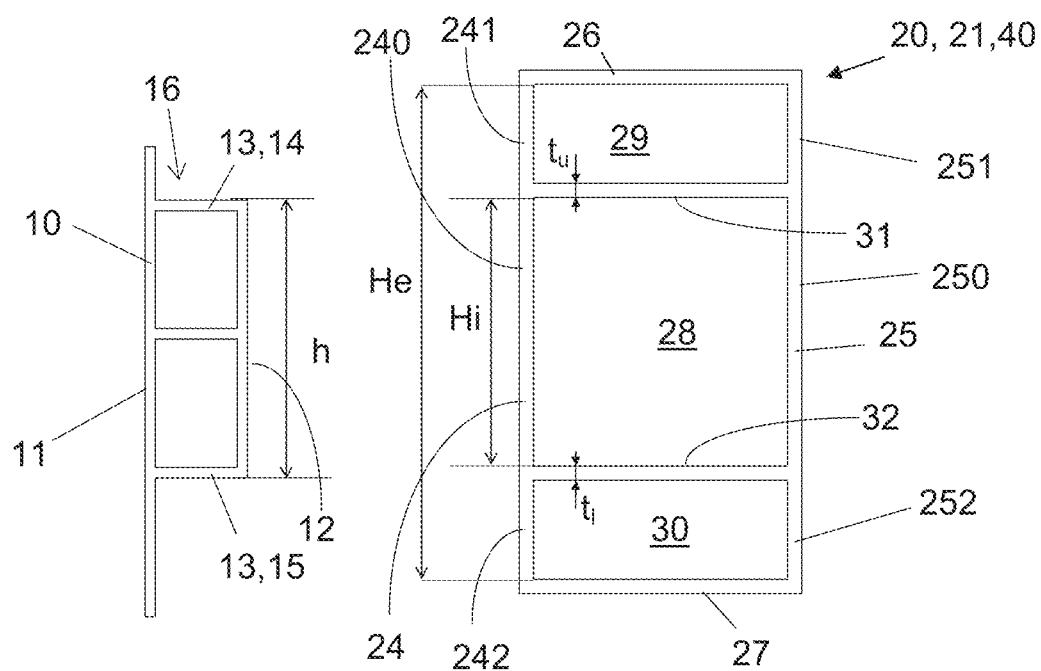
FIG. 2a illustrates schematically the cross-section of a particular bumper cross-beam belonging to a bumper system according to the invention.
FIG. 2b illustrates schematically the cross-section of a multi-chamber hollow profile used to manufacture an attachment means according to the invention.

The bumper system (100) comprises a bumper cross-beam (10) and two attachment means (20) for mounting the said bumper cross-beam onto the longitudinal beams of a vehicle (not illustrated). The bumper cross-beam according to the invention comprises a front wall (11) and a rear wall (12) spaced apart thanks to flanking walls (13), typically a substantially horizontal upper wall (14) and a substantially horizontal lower flanking wall (15). The front wall (11), the rear wall (12) and the flanking walls (14 and 15) form the periphery of the hollow section member (16) of the bumper cross-beam (10). The height h of the said hollow section member (16), represents the dimension of the space defined by said flanking walls, to which the said double-walled flanges of the attachment means should be attached.

Each attachment means is made from a hollow section profile (21) having a first end (22) to be fixed to the said longitudinal beams of the vehicle structure and a second end (23) designed to overlap the said flanking walls (13) of the bumper cross-beam (10) and to be releasably attached thereto. The periphery of the cross-section of the hollow section profile (21) comprises opposite side walls (24) and (25), an upper outer wall (26) and a lower outer wall (27). The hollow section profile (21) comprises a lower chamber (30) delimited by parts (242 and 252) of the opposite side walls (24) and (25), the lower outer wall (27) and a lower inner wall (32), which is parallel to the lower outer wall (27) and extends between the said side walls (24) and (25), and an upper chamber (29) delimited by parts (241 and 251) of the opposite side walls (24) and (25), the upper outer wall (26) and an upper inner wall (31), which extends between the opposite side walls (24) and (25). Hi is the distance between the upper inner wall (31) and the lower inner wall (32). He is the distance between the upper outer wall (26) and the lower outer wall (27) of the undeformed part of the hollow section profile (21) of the attachment means (20). Disregarding the outer wall thicknesses, He is a representative dimension of the height of the hollow section profile (21). The lower chamber (30) and the upper chamber (29) are opposite peripheral chambers separated by a middle chamber (28), which is delimited by the said upper inner wall (31), lower inner wall (32) and parts (240 and 250) of the said opposite side walls (24 and 25).

As illustrated in FIGS. 3a, 3b, 4 and 5, the second end (23) is shaped such that it comprises opposite double-walled flanges: an upper double-walled flange (41) resulting from collapsing the upper chamber (29) and a lower double-walled flange (42), resulting from collapsing the lower chamber (30).

Figure 3A:
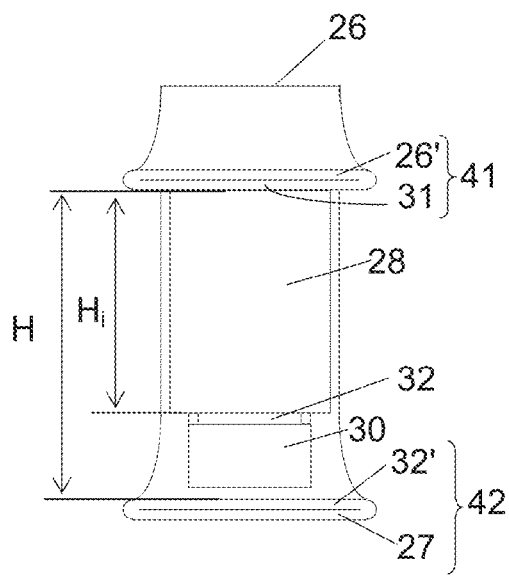
FIG. 3a and FIG. 3b are front views of the second ends of different attachment means according to the invention.
Figure 4:
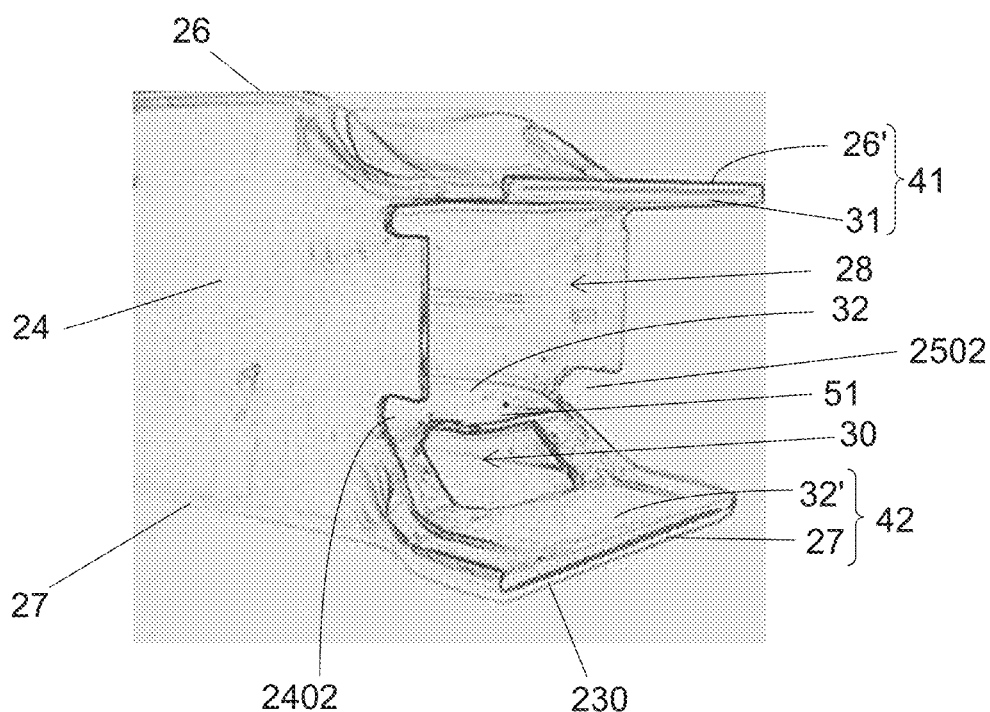
FIG. 4 and FIG. 5 are perspective views of the ends of different embodiments of attachment means according to the invention.
Figure 6:
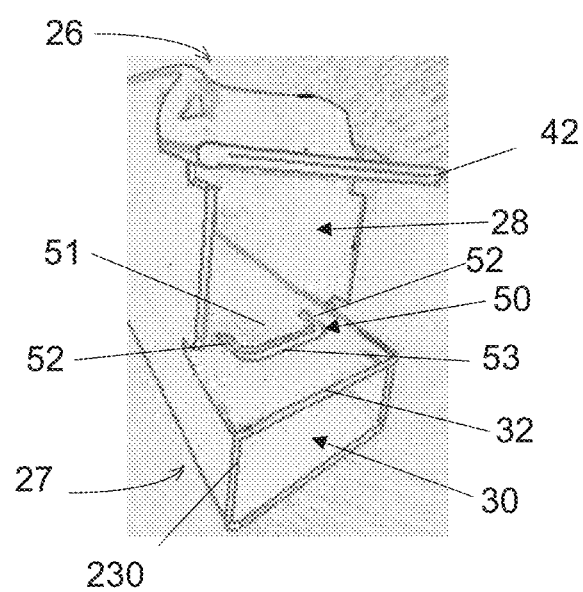
FIG. 6 is a perspective view, which illustrates the second end of the attachment means of FIG. 3a in an intermediate step of its manufacturing process, i.e. before step c).

In the first embodiment, illustrated in FIGS. 3a, 4 and 6, the upper double-walled flange (41) results from collapsing the upper chamber (29), at the second end (23) of the hollow section profile (21) and over a length approximately equal to half the height of the said hollow section profile. The upper chamber (29) was collapsed by pushing and pressing the upper outer wall (26) towards the corresponding inner wall (31) until the said upper outer wall (26') comes into contact with the said inner wall (31). By this way, the double-walled flange (41) thus formed is in a substantially straight continuation of the inner wall (31) of the undeformed part of the hollow section profile. The lower double-walled flange (42) results from collapsing the lower chamber (30), by pushing and pressing the lower inner wall (32) towards the lower outer wall (27) until the said lower inner wall (32') comes into contact with the said lower outer wall (27). By this way, and since the outer wall (27) has not been previously deformed, the double-walled flange (42) thus formed is in a substantially straight continuation of the lower outer wall (27) of the undeformed part of the hollow section profile. The double-walled flanges of the embodiment of FIG. 3a are offset with respect to the outer walls of undeformed part of the hollow section profile of the attachment means, such that the bumper cross-member may be positioned in different heights relative to the vehicle structure.

Figure 3B:
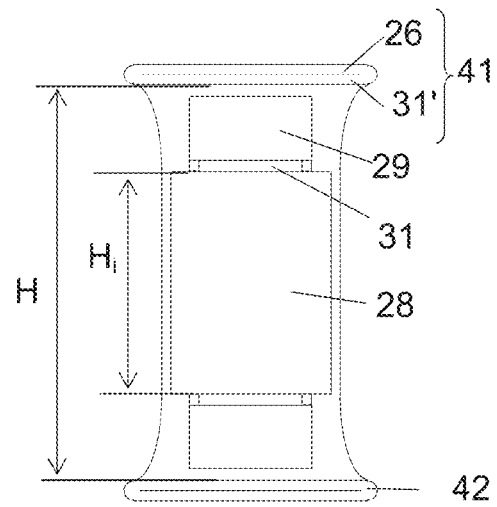

FIG. 3b illustrates another embodiment, where both peripheral chambers (29 and 30) were collapsed by pushing and pressing the inner walls (31 and 32) towards their corresponding outer walls (26 and 27) until they enter into contact therewith. By this way, and since the outer walls have not been previously deformed, the opposite double-walled flanges (41 and 42) thus formed are in a substantially straight continuation of the outer walls (26 and 27) of the undeformed part of the hollow section profile. They are distant from each other by a distance approximately equal to $He-t_l-t_u$, where $t_l$ is the thickness of the lower inner wall (32) and $t_u$ is the thickness of the upper inner wall (31).

Figure 5:
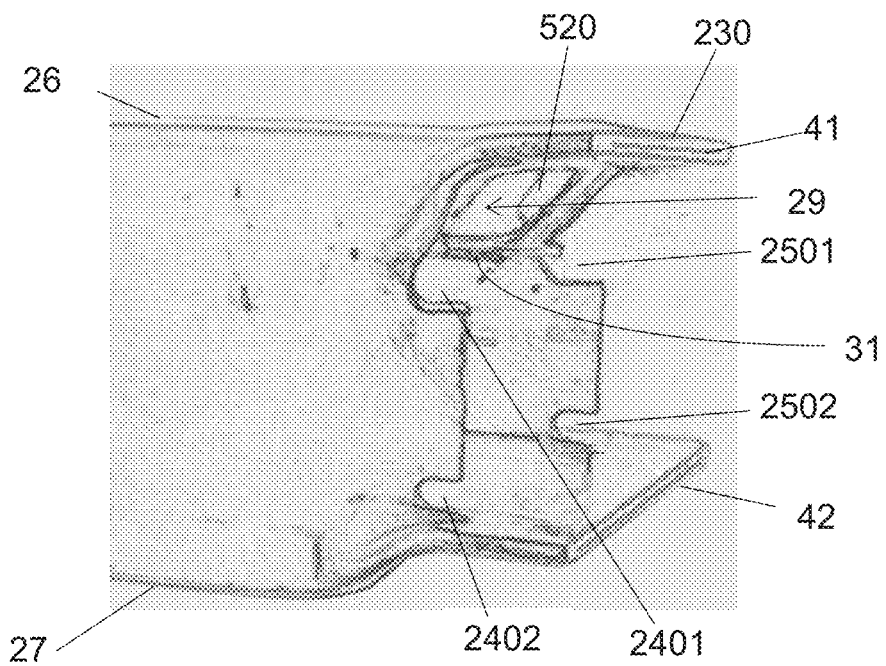

The attachments means (20) of FIG. 3a, FIG. 3b and FIG. 5 are deformation elements (40) designed to absorb at least partially the energy of impact by buckling-free progressive plastic folding. They are made from multi-chamber hollow section profiles extruded from AA6008 aluminium alloy. The second ends (23) of both attachment means of FIG. 3a, FIG. 3b and FIG. 5 have opposite double-walled flanges (41 and 42), the distance H between which is higher than the height Hi of their middle chamber (28). Consequently, they may be fit with a bumper cross-beam having a hollow section member with a height h higher than the height Hi of the middle chamber (28) in the undeformed part of the hollow section profile (21). The attachment means of FIG. 3b has symmetrical opposite double-walled flanges (41 and 42), which have a symmetrical mechanical behaviour and allow a stable and stiff connection with the bumper cross-beam.

As illustrated in FIG. 4 and FIG. 5, the parts (240 and 250) of the opposite side walls (24 and 25) at the level of the middle chamber (28) have portions which are removed near the edge of the second end (23), to form notches, which allow the hollow section member (16) of the bumper cross-beam (10) to engage at least partially in the space between the opposite double-walled flanges (41 and 42). The said notches have also slot-shaped extensions (2401 and 2501; 2402 and 2502) to facilitate the collapse of a peripheral chamber (29, 30). Thanks to the said notches, the total length of which is typically higher than He/2, the inner wall (31, 32) of the peripheral chamber (29, 30) to be collapsed may be more easily displaced towards the corresponding outer wall (26, 27).

In the embodiment of FIG. 3a, FIG. 4 and FIG. 6, a U-shaped slot (50) is perforated through the thickness of the inner wall (32) before step c) to facilitate the collapse of the lower chamber (30) by pushing the lower inner wall (32) towards the lower outer wall (27). The flanges (52) of the U are oriented along the longitudinal direction of the profile and the base (53) of the U is near the edge (230) of the profile end (23). After the collapse of the lower chamber (30), the tongue (51) delimited by the U-shaped slot (50) remains in the substantially straight continuation of the inner wall (31). The part of the lower inner wall (31), which was outside the U-shaped slot, was not retained by the tongue (51) when the pushing tool was applied on to push it against the lower outer wall (27). It was therefore more easily plastically deformed.

In the embodiment of FIG. 5, two longitudinal slots were perforated through the thickness of the upper inner wall (31) before step c) to facilitate the collapse of the upper chamber (29) by pushing the upper inner wall (31) towards the upper outer wall (26). The edges of these slots are deformed differently, so that substantially diamond-shaped cavities (520) are obtained.

The invention claimed is:

1. An attachment device for mounting a bumper cross-beam onto a vehicle structure, said attachment device comprising:
   a first end configured to be fixed to said vehicle structure, and
   a second end configured to be attached to said bumper cross-beam,
   said second end comprising opposite double-walled flanges which are spaced apart from each other by a distance H,
   wherein said attachment device is made from a hollow section profile, the periphery of which comprises opposite side walls and substantially parallel opposite outer walls,
   wherein said hollow section profile comprises opposite peripheral chambers, each peripheral chamber being at least delimited by one of said opposite outer wall and an inner wall, which is substantially parallel to said outer wall and extends between said opposite side walls,
   wherein said inner walls are spaced apart from each other by a distance Hi,
   wherein each of said opposite double-walled flanges results from bringing closer together the outer wall and the inner wall of a peripheral chamber until they are in contact, such that said peripheral chamber collapses,
   wherein the distance H is strictly greater than the distance Hi, and
   wherein at least one of said opposite double-walled flanges results from pushing the inner wall towards the outer wall of the peripheral chamber to be collapsed.

2. The attachment device according to claim 1, wherein said opposite outer walls are spaced apart from each other by a distance He, and in that the distance between said opposite double-walled flanges is lower than 1.2*He.

3. The attachment device according to claim 1, wherein at least one of said opposite double-walled flanges results from pushing the outer wall towards the inner wall of the peripheral chamber to be collapsed, such that said double-walled flange is offset with respect to the outer wall of the undeformed part of said hollow section profile.

4. The attachment device according to claim 1, wherein the parts of the opposite side walls, which do not delimitate the peripheral chamber to be collapsed, and are near the inner wall to be pushed, have portions, which are removed to form notches extending from the edge of said second end along a given length, typically higher than He/2.

5. The attachment device according to claim 1, wherein the inner wall of the peripheral chamber to be collapsed comprises near the edge of the second end, at least one slot to facilitate said inner wall and the corresponding outer wall to be brought closer together.

6. The attachment device according to claim 1, wherein the hollow section profile comprises an upper chamber and a lower chamber separated from each other by a middle chamber, wherein a lower inner wall separates said lower chamber from said middle chamber and an upper inner wall separates said upper chamber from said middle chamber, and wherein portions of the parts of the opposite side walls which delimitate the middle chamber are removed to form notches extending from the edge of said second end along a given length, typically higher than He/2.

7. The attachment device according to claim 1, wherein said attachment device is a deformation element, configured to absorb, at least partially, the energy of impact by a buckling-free, progressive plastic folding thereof.

8. A bumper system comprising a bumper cross-beam and the attachment device according to claim 1,
wherein each of said opposite double-walled flanges overlaps a wall or rib provided in the bumper cross-beam, so that each pair of double-walled flange and wall or rib can be traversed by a fixing means.

9. The bumper system according to claim 8, wherein the bumper cross-beam comprises a front wall and a rear wall spaced apart by substantially parallel opposite flanking walls, and wherein each of said opposite double-walled flanges overlaps each of said opposite flanking walls so that each pair of double-walled flange and flanking wall can be traversed by fixing means.

10. A process for manufacturing an attachment device for mounting a bumper cross-beam onto a vehicle structure, said process comprising the successive steps of:
a) providing a hollow section profile, with a cross-section having a periphery comprising opposite side walls, and opposite outer walls, wherein the hollow section profile comprises opposite peripheral chambers delimited at least by one of said opposite outer walls and an inner wall, which is substantially parallel to said outer wall and extends between said opposite side walls;
b) cutting said hollow section profile at a predetermined length to obtain a profile part;
c) at one of the ends of said profile part, over a length at least equal to the half-height of said profile part, collapsing at least one of said opposite peripheral chambers, by pushing the inner wall towards the outer wall of said peripheral chamber to be collapsed.

11. The process according to claim 10, wherein, before step c), portions are removed in the parts of the opposite side walls, which are near the peripheral chamber to be collapsed, but which do not delimitate it, to form notches extending from the edge of said end of the profile part along a given length.

12. The process according to claim 10, wherein said hollow section profile comprises a middle chamber which separates said opposite peripheral chambers and lower chamber, and wherein, before step c), portions of the parts of the opposite side walls which delimitate the middle chamber are removed to form notches extending from the edge of said end along a given length.

13. The process according to claim 10, wherein, before step c), the inner wall which delimitates the chamber to be collapsed is perforated to form one or more slot(s) through its thickness to facilitate the chamber to be collapsed.

14. The process according to claim 12, wherein a U-shaped slot is stamped through the thickness of said inner wall, wherein the flanges of the U are oriented along the longitudinal direction of the profile and the base of the U is located near the edge of said end of the profile part.

15. The attachment device according to claim 2, wherein the distance between said opposite double-walled flanges is lower than 1.1*He.

16. The process according to claim 11, wherein the given length is higher than He/2.

17. The process according to claim 12, wherein the given length is higher than He/2.

* * * * *